United States Patent [19]

Whitmyer

[11] Patent Number: 4,650,702

[45] Date of Patent: Mar. 17, 1987

[54] STRUCTURAL INTERFACE AND WEATHERSEAL FOR STRUCTURALLY BONDED GLAZING

[75] Inventor: Wayne E. Whitmyer, Lilburn, Ga.

[73] Assignee: Kawneer Company, Inc., Norcross, Ga.

[21] Appl. No.: 787,435

[22] Filed: Oct. 15, 1985

[51] Int. Cl.[4] .......................... B60R 13/00; E06B 3/24

[52] U.S. Cl. .......................................... 428/31; 428/38; 52/235; 52/397; 52/398; 52/403

[58] Field of Search ................. 52/235, 397, 398, 403; 428/31, 38

[56] References Cited

U.S. PATENT DOCUMENTS

| | | | |
|---|---|---|---|
| 3,722,161 | 3/1973 | Brown | 52/400 |
| 4,377,926 | 3/1983 | Coulston et al. | 52/309.3 |
| 4,464,874 | 8/1984 | Shea, Jr. et al. | 52/398 |
| 4,525,966 | 7/1985 | Litchfield et al. | 52/397 |
| 4,537,003 | 8/1985 | Huber et al. | 52/573 |

FOREIGN PATENT DOCUMENTS 2044832 10/1980 United Kingdom .

*Primary Examiner*—John E. Kittle
*Assistant Examiner*—Patrick J. Ryan
*Attorney, Agent, or Firm*—Jones and Askew

[57] ABSTRACT

An adhesively glazed curtainwall system, comprising prebonded structural interfaces on each light of glass of the curtainwall system, which are clipped during glazing onto the respective mullions of the curtainwall; and means for nonstructurally weather sealing between adjacent lights of glass of the curtainwall and which are installed from the interior side of the curtainwall coincidentally with glazing and are configured so as to be captured by said structural interfaces when clipped onto said respective mullions.

20 Claims, 5 Drawing Figures

STRUCTURAL INTERFACE AND WEATHERSEAL FOR STRUCTURALLY BONDED GLAZING

TECHNICAL FIELD

The present invention generally relates to an adhesively glazed curtainwall system and more particularly relates to such a system in which weathersealing is accomplished from the interior side of said curtainwall during glazing.

BACKGROUND ART

In building structures, it is often aesthetically desirable to cover large portions of the outside of the structures with as much glass as possible, and thereby provide a smooth and unbroken outside surface appearance. In order to provide such an appearance, it is necessary to minimize the appearance of the edges of the glass panels. Therefore, it is well known in the art to provide an adhesive bond beween the building structure and the inside surface of the glass panels which attaches the window panes to the building structure. Such bonding configurations are commonly known as "Structural Silicone Glazing," or "SSG" systems.

Typical SSG systems fall into two major classes; two-sided and four-sided. Four-sided SSG systems usually are comprised of a plurality of vertical structural mullions in combination with a plurality of horizontal structural mullions, which combine to form a mullion framework having a plurality of panel-shaped openings which are slightly smaller than the glass panels to be supported. The glass panels are positioned adjacent to the exterior surface of the mullion framework and over the panel-shaped openings by a plurality of temporary retaining clip such that the edges of the panels slightly overlap the panel-shaped openings and a small gap exists between the inside surface of the glass panels and the frame. Structural silicone adhesive is then applied in the gap. After the silicone adhesive cures, it provides a structural bond between the mullion framework and the glass panels which can completely support the glass panels without any aid from the temporary retaining clip or other outside retention means.

Additional silicone adhesive is then applied from the outside of the building into the gap created by the abutting edges of the glass panels, which provides a weatherproof seal. Disadvantageously, this "weatherbead" must be applied from the exterior of the building.

Two-sided SSG systems differ in that a structural bond is provided on the inside surface adjacent two opposing edges of the glass (usually the two vertical edges) and the corresponding frame member. In two-sided SSG systems, the two edges not being structurally bonded to the mullion framework must be retained by other means. This is normally done by conventional window glazing means which enclose the entire edge of the glass panel, which do not allow for the smooth, continuous appearance of the four-sided SSG system.

An improvement in adhesively glazed curtainwall systems includes prebonding an intermediate bracket to the inside of the glass panels, then allowing the structural silicone to cure, and thereafter mechanically fastening the intermediate bracket to the structural mullions. This resulting configuration, sometimes referred to as a "prebonded" SSG system, allows the structural silicone to be applied under controlled conditions, and insures more reliable and efficient adhesion of the glass panels to the building structure. However, the final silicone weatherproofing seal must still be applied at the pane edges from the exterior of the building.

Although such known prior art SSG systems are in demand, the cost for such systems is high. One reason is due to the fact that the final weatherproofing bead of silicone sealant applied to the gap between adjacent panels must be applied from the exterior of the building. This requires exterior scaffolding and relatively expensive field labor. Furthermore, the quality of the weather proofing joint is highly dependent upon the skill of the field laborer applying the sealant. Therefore, it is highly desirable to provide an improved SSG system which may be installed from the inside of the building structure during installation of the glass panels, which obviates the need for outside scaffolding and additional field labor to complete weatherproofing of the SSG window system.

SUMMARY OF THE INVENTION

The invention is used in combination with adhesively bonded glazing in which structural adhesive, representatively structural silicone, is pre-applied to intermediate bracket members under controlled conditions, and subsequently the bracket members are mechanically fastened to the structural mullions at the job site. The invention provides a weatherseal which may be installed from the inside of the building during the installation of the lights of glass to seal between adjacent edges of the installed lights.

In the apparatus aspects of the invention, there is provided an adhesively glazed curtainwall system comprising prebonded structural interfaces on each light of glass of the curtainwall system, which are clipped during glazing onto the respective mullions of the curtainwall, and means for nonstructurally weathersealing between adjacent lights of glass of the curtainwall and which are installed from the interior side of the curtainwall coincidentally with glazing and are configured so as to be captured by the structural interfaces when clipped onto the respective mullions.

It is an object of the invention to provide a weatherseal for structural adhesive glazing.

It is a further object of the invention to provide a weatherseal for structural adhesive glazing which is installed from the inside of the building structure.

It is a further object of the invention to provide a weatherseal which is used in combination with a prebonded structural silicone glazing system, wherein the weatherseal is installed from the inside of the building structure.

Other objects, features, and advantages of the present invention will become apparent upon reading the following detailed description of the preferred embodiments of the invention, when taken in conjunction with the drawings and the appended claims.

DETAILED DESCRIPTION OF THE PREFERRED EMBODIMENT

Figure 1:
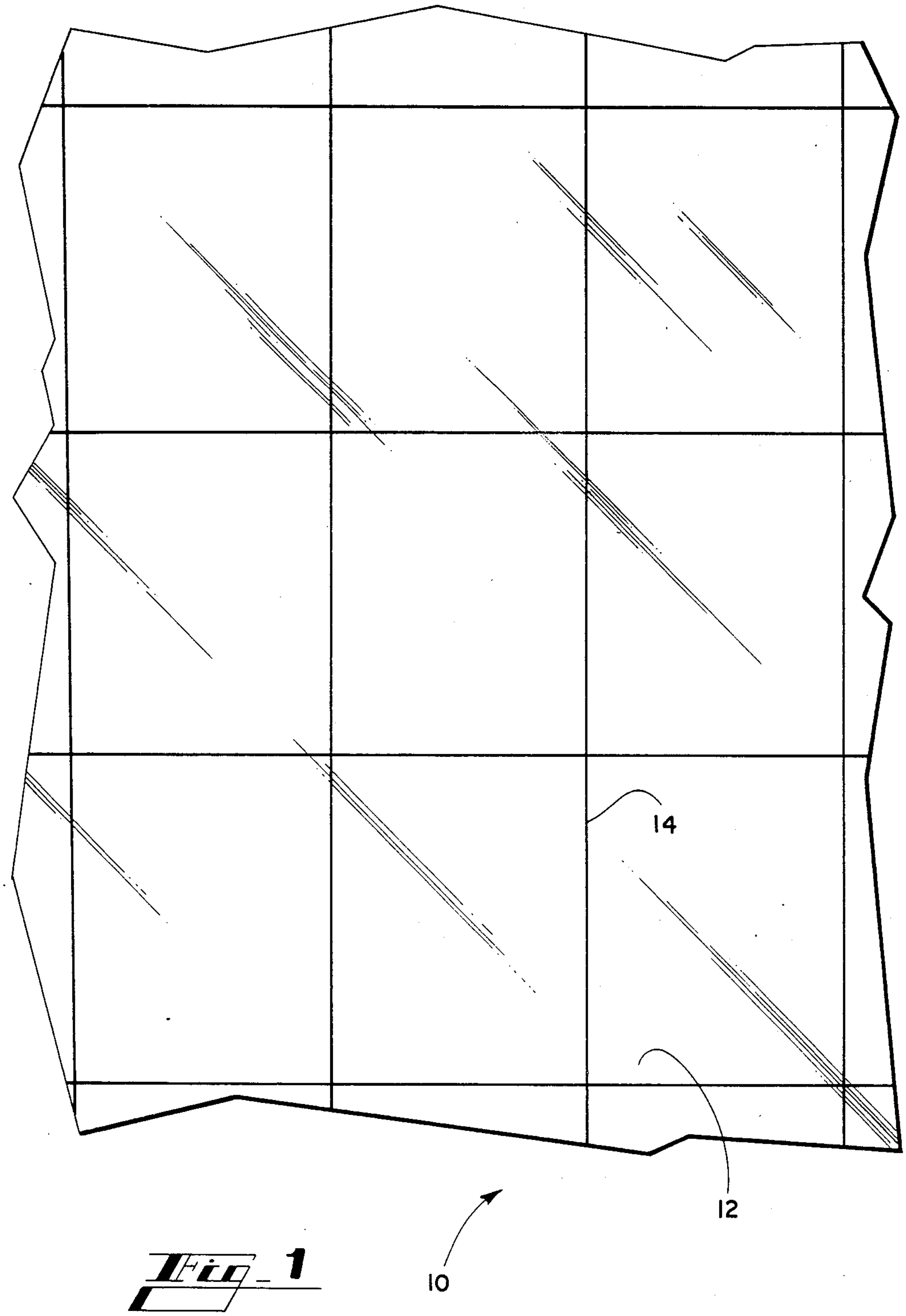
FIG. 1 is an exterior front elevation view of a portion of a 4-sided adhesively glazed curtainwall system.

Referring now in more detail to the drawings, in which like numerals indicate like parts throughout the several views, FIG. 1 shows a 4-sided structural silicone glazing system 10 which includes a plurality of rectangular glass panel assemblies 12 and weatherstripping 14. The glass panel assemblies 12 may be single thickness panels or double panels, as desired.

Figure 2:
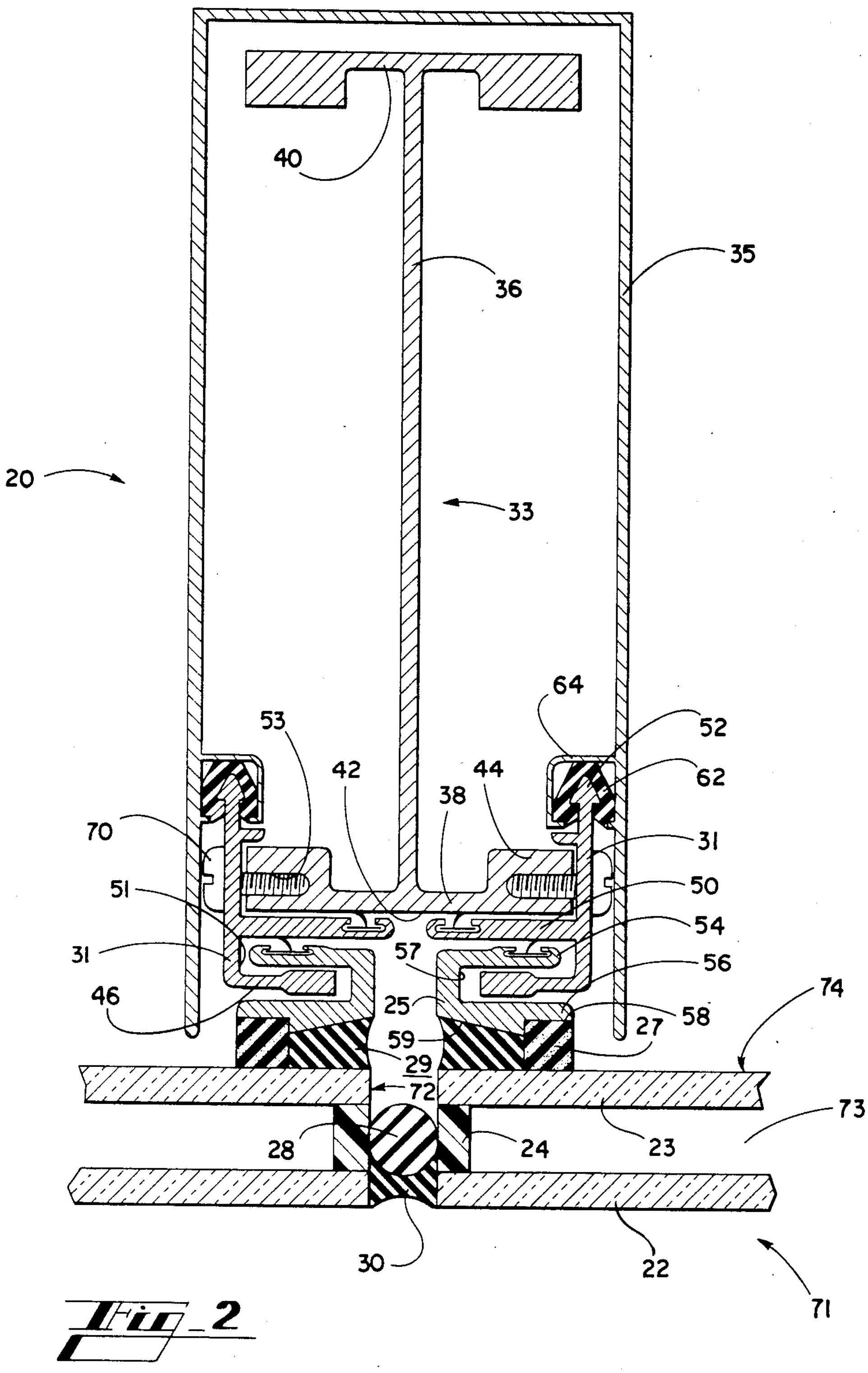
FIG. 2 is a transverse cross section through a vertical mullion in a first prebonded structural silicone glazing system.

FIG. 2 shows a prebonded structural silicone glazing system 20 for supporting double glass panels which includes outside glass panels 22, inside glass panels 23, glass spacers 24, U-shaped interface brackets 25, adhesive spacers 27, a flexible plug 28, structural silicone 29, a silicone weatherbead 30, F-shaped retaining clips 31, an I-shaped vertical mullion 33, and a mullion cover 35.

Vertical mullion 33 is elongate and has an I-shaped transverse cross section and includes a central structural plate 36, a front mounting plate 38 and a rear structural plate 40. The front mounting plate 38 defines a front mounting surface 42 and includes pairs of opposing flanges 44. Front mounting surface 42 is substantially perpendicular to the primary planar surfaces of central structural plate 36.

Retaining clips 31 have an elongate shape and an F-shaped transverse cross section and include a retaining end flange 46, an intermediate flange 50, and a barbed end 52. Retaining end flange 46 and intermediate flange 50 combine to define a channel 51.

Interface brackets 25 have an elongate shape and a U-shaped cross section, and include an inside leg 54 and an outside leg 56. Inside leg 54 and outside leg 56 combine to define a channel 57. Outside leg 56 defines a shouldered surface 58 and a beveled surface 59.

Outside and inside glass panels 22 and 23 are maintained in a rigid spaced-apart relationship by glass spacer 24.

The mullion cover 35 has an elongate shape and a U-shaped transverse cross section, and includes a pair of elongate flexible channels 62 attached to the inside of mullion cover 35 by means of elongate mounts 64.

Interaction of the individual elements is now discussed. Each of the outside legs 56 of interface brackets 25 are bonded to the inside surface 74 of a corresponding inside glass panel 23 by adhesive spacers 27 and structural adhesive 29 such as silicone. The inside leg 54 of each of interface brackets 25 is captured in the channel 51 defined by the retaining end flange 46 and the intermediate flange 50 of each of retaining clips 31. Each of retaining clips 31 are fastened to vertical mullion 33 by means of a plurality of bolts 70 which pass through a corresponding plurality of holes in retaining clips 31 and threadably engage the walls of self-threading slots 53, defined by flanges 44 of vertical mullion 33. When the retaining clips 31 are secured to the vertical mullion 33, one side of the intermediate flange 50 of each of retaining clips 31 abuts the front mounting surface 42 defined by front mounting wall 38 of vertical mullion 33.

The above-mentioned assembly is covered by a mullion cover 35. The barbed edge 52 of retaining clip 31 is received and engaged by flexible channels 62. Flexible channels 62 are attached to mullion cover 35 by means of elongate mounts 64.

Steps of assembly of the system shown in FIG. 2 are now discussed. Outside and inside glass panels 22 and 23 are bonded on opposite sides of spacer 24 by means well known in the art, creating a glass panel assembly 71 having edges 72 and defining an air gap 73. Adhesive spacers 27 having adhesive contacting surfaces are placed between and in contact with the inside surface 74 of inside glass panels 23 and the shouldered surface 58 of each of interface brackets 31. This forms a preliminary positioning bond between the inside glass panel 23 and the interface bracket 31. A continuous bead of structural adhesive 29, such as silicone, is then injected into the channel created by the inside surface 74 of the inside glass panel 23, the adhesive spacer 27, and the beveled surface 59 of interface bracket 31. The structural silicone 29 is then allowed to cure.

When the structural adhesive 29 has cured, the glass panel assembly 71 with attached interface brackets 25, is taken to the job site for mounting on a building with existing vertical mullions 33. The glass panel assembly 71 is then positioned adjacent to the vertical mullions 33. The retaining clips 31 are fastened to the structural mullions by means of bolts 70 as previously described. When the retaining clips 31 are in place, the mullion cover 35 is then snap-fitted onto the retaining clips 31, with flexible channels 62 receiving and engaging barbed edges 52 defined by each of the retaining clips 31.

When the installation of glass panel assemblies 71 is complete, the flexible plug 28 having an elongate shape and a circular cross section is pressed into the gap between the edges 72 of glass assemblies 71 such that a small recess is left into which the silicone weatherbead 30 may be injected.

Figure 3:
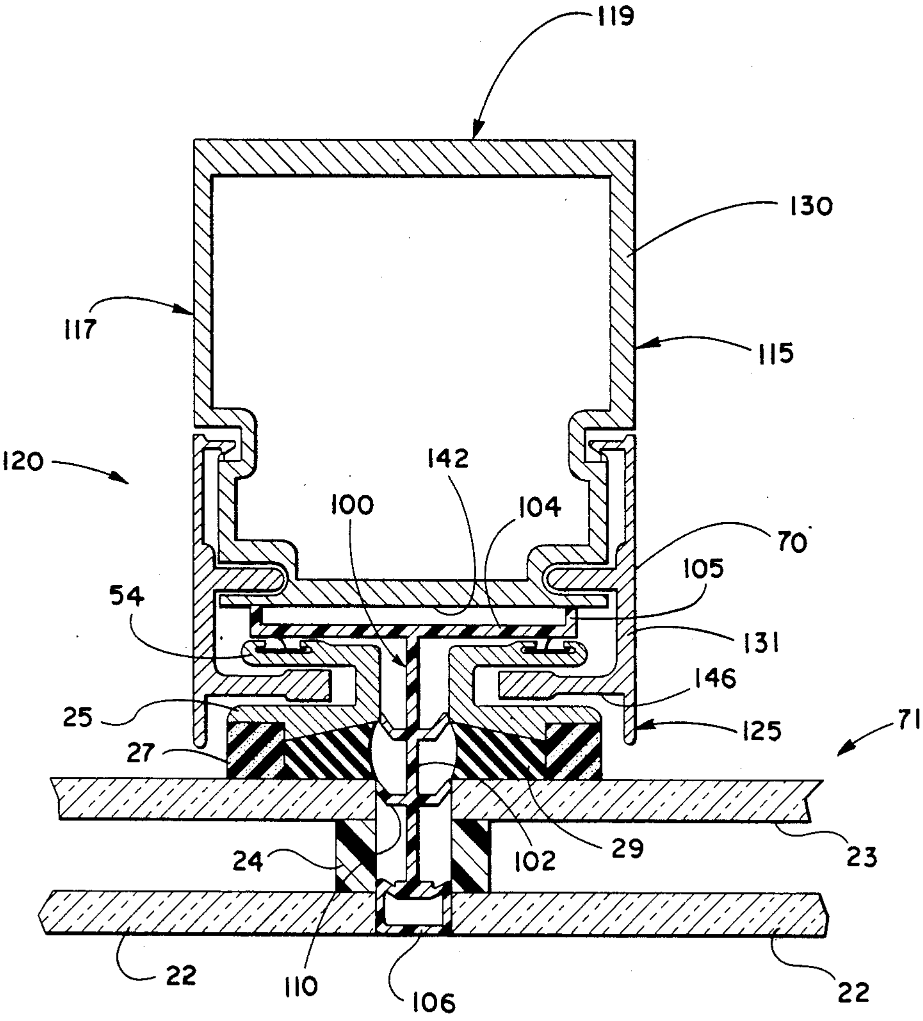
FIG. 3 is a transverse cross section through a vertical mullion in a second prebonded structural silicone glazing system having an interior installed weatherseal.

FIG. 3 discloses a prebonded structural silicone glazing system 120 including a T-shaped weatherseal 100.

It should be noted that structural mullion 130 of prebonded structural glazing system 120 is substantially similar to structural mullion 33 of FIG. 2, but differs in that it is hollow and has an aesthetically pleasing outside finish on exposed sides 115 and 117, and rear side 119. Similarly, retaining clips 131 serve the same structural purpose as retaining clips 31 in FIG. 2 in that they grasp and retain interface brackets 25, but differ in that they have an aesthetically pleasing finish on exposed side 125, and have an L-shaped cross section including an end flange 146, instead of the F-shaped cross section of retaining clip 31 of FIG. 2. Therefore, it may be seen that by providing finished surfaces on the exposed edges of the structural mullion 130, and the retaining clip 31, there is no mullion cover.

The weatherseal 100 has an elongate shape and generally T-shaped cross section, and includes a primary stem member 102, two arm members 104 having upturned ridge members 105, a sealing bulb 106, and a plurality of sealing vanes 110. The arm members 104 are coplanar and both extend from one end of stem member 102 and extend perpendicular to primary stem member 102. The sealing vanes 110 are coplanar and extend in pairs from locations along the length of the primary stem member 102 and extend perpendicular to the primary stem member 102. The preferred embodiment discloses two pairs of sealing vanes 110, but more or fewer vanes may be used without departing from the spirit and scope of the present invention. It should also be noted that the sealing vanes 110 may be optionally biased toward the interior of the curtainwall for the purpose of facilitating insertion of the weaterseal between the glass panel assemblies 71.

The composition of the weatherseal 100 is such that some elements of the weatherseal 100 provide support for other more flexible elements of the weatherseal 100 which provide sealing functions. For example, the primary stem member 102, the arm members 104, and the upturned ridge members 105 of the weatherseal 100 are relatively rigid. The sealing vanes 110 and the sealing bulb 106 are flexible and elastically tend to resume an original shape. This configuration is achieved by a conventional process known as "coextrusion", in which two different polymeric materials are simultaneously extruded. This allows the coextruded product to exhibit different properties over its transverse cross-section.

The interaction of the weatherseal 100 with the prebonded structural silicone glazing system shown in FIG. 3 is now discussed. Each of the arm members 104 is captured between the inside leg 54 of the interface brackets 25 and the front mounting surface 142 of the structural mullion 130. The primary stem member 102 extends between the edges of the outside and inside glass panels 22 and 23, respectively, as well as between the glass spacers 24. The sealing bulb 106, mounted on one end of the primary stem member 102, is positioned between the edges of the outside glass panels 22, and is of a cross section which fills the gap created by the edges of the ouside glass panels 22. The sealing vanes 110 contact the glass spacers 24, the edges of the inside panels 23, the interface brackets 25, or any combination thereof, depending on the positioning of the sealing vanes 110 along the primary stem member 102.

It should thus be understood that the sealing bulb 106 effectively replaces the silicone weatherbead 30 as disclosed in the system shown in FIG. 2. The sealing vanes 110 act as secondary weathering seals.

As previously stated, the weatherseal 100 is positioned between a pair of two separate glass panel units 71, as well as pairs of interface brackets 25, retaining clips 131, etc. Therefore, for purposes of illustrating the step-by-step installation of the weatherseal 100, the units to the left of the weatherseal 100 will remain the same, but the units to the right will be given a "prime" suffix. Elements not in pairs will remain unchanged. For example, an interface bracket which is to the left of the weatherseal as viewed from the exterior of the window will be denoted as left interface bracket 25, and the bracket to the right will be denoted as right interface bracket 25'. The weatherseal will remain denoted as 100.

Installation of the weatherseal 100 as shown in FIG. 3 is now discussed. Inside and outside glass panels 22 and 23, respectively, are bonded to spacers 27 as previously discussed, to form left and right glass panel assemblies 71 and 71'. Left and right interface brackets 25 and 25' are bonded to the inside surface of the inside glass panels 23, by the adhesive spacer 27 and structural adhesive 29 as previously described. Both of glass panel assemblies 71 and 71' and attached interface brackets 125 and 125' are then positioned in place. The weatherseal 100 is then installed between the interface brackets 25 and 25' and glass panel assemblies 71 and 71' with arm members 104 and 104' of the weatherseal 100 resting against the outside legs 54 and 54' of interface brackets 125 and 125'. The structural mullion 30 is then positioned into place with the front mounting surface 142 coming in contact with the ridge members 105 and 105' of weatherseal 100, thus capturing the weatherseal 100 in place. Retaining clips 131 and 131' are then bolted in place, thus holding the interface brackets 25 and glass panel assemblies 71 and 71' in place.

Figure 4:
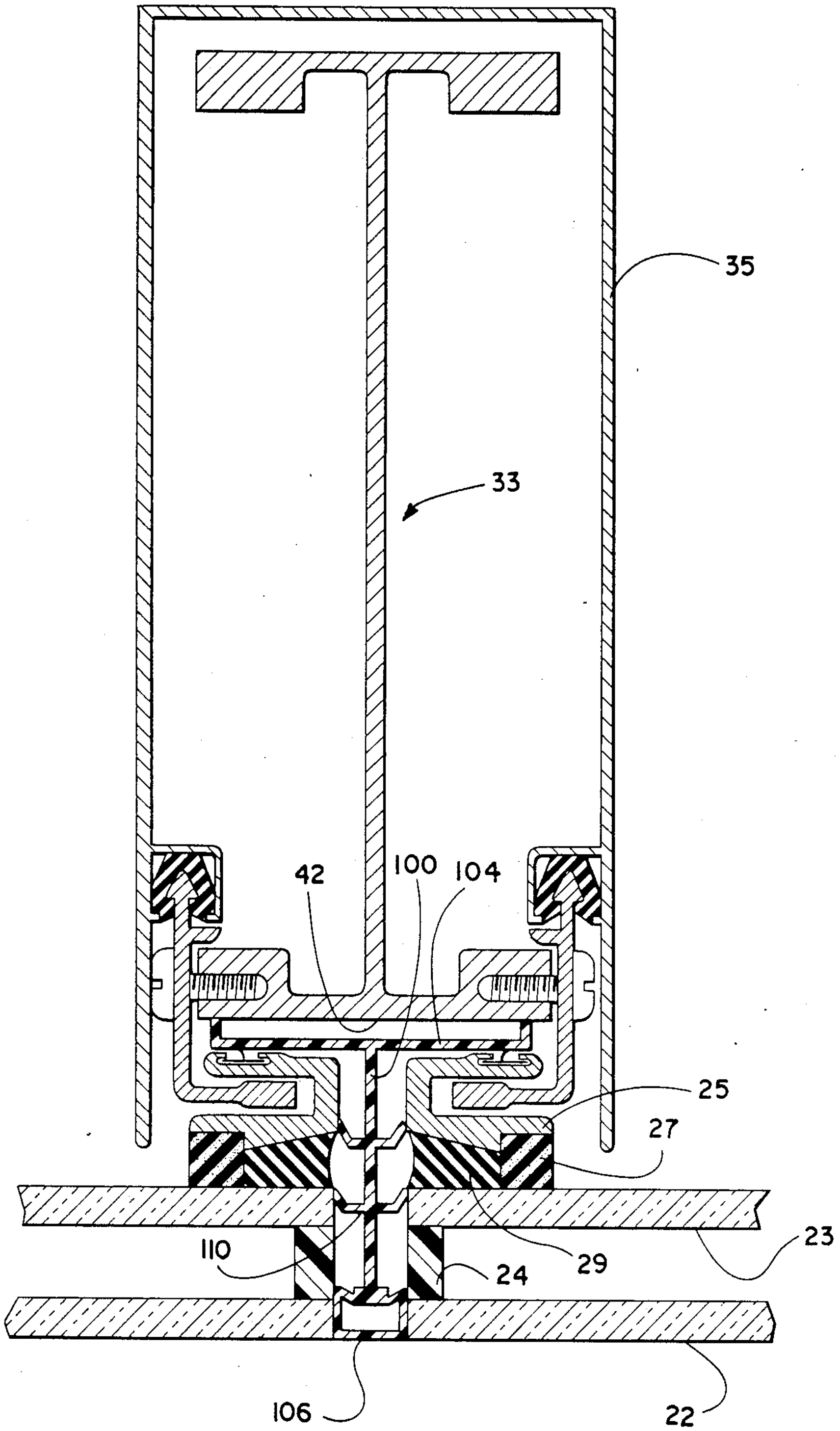
FIG. 4 is similar to FIG. 3, but further including a mullion cover.
Figure 5:
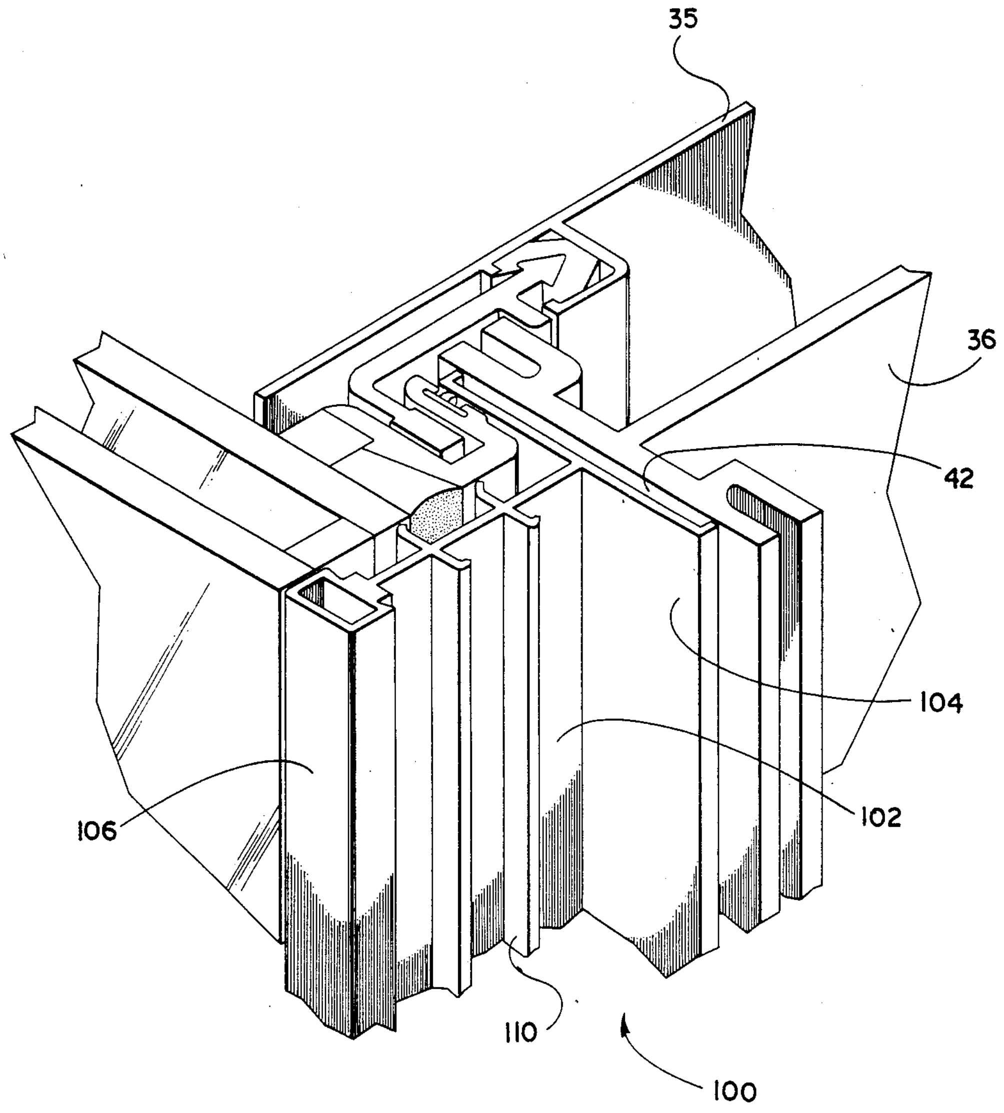
FIG. 5 is a perspective cutaway of FIG. 4, further illustrating the weatherseal in its installed configuration between adjacent lights of glass.

FIGS. 4 and 5 show the weatherseal 100 of the present invention in use with a prebonded structural silicone glazing system similar to FIG. 3, but having a mullion cover 35. The weatherseal 100 is installed in a manner similar to that described in reference to FIG. 3, with the arm members 104 of the weatherseal 100 being captured between the interface brackets 25 and the front mounting surface 42 of mullion 36.

Therefore, it may be understood that the weatherseal 100 effectively replaces the external weatherproofing adhesive 30 as used in prior art adhesively glazed curtainwall systems. The entire assembly method may be completed from within the building, and no external scaffolding is needed to install an external weatherproofing seal from the exterior of the building.

While this invention has been described in detail with particular reference to preferred embodiments thereof, it will be understood that variations and modifications can be effected within the spirit and scope of the invention as described hereinbefore and as described in the appended claims.

I claim:

1. An adhesively glazed curtainwall system, comprising:

prebonded structural interfaces on each light of glass of the curtainwall system, which are secured during glazing onto the respective mullions of the curtainwall; and elongate weather seals for nonstructurally weather sealing between adjacent lights of glass of the curtainwall and which are installed from the interior side of the curtainwall coincidentally with glazing and are configured so as to be captured by said structural interfaces when clipped onto said respective mullions, and wherein said adjacent lights of glass are nonabutted;

each said elongate weather seal having a coextensive base member configured for capture by said structural interfaces, and a coextensive stem member configured to extend nonstructurally between adjacent lights of glass.

2. The curtainwall system of claim 1 wherein said means comprise an elongate weather seal having a coextensive base member configured for capture by said structural interfaces, and a coextensive stem member configured to extend nonstructurally between adjacent lights of glass.

3. The curtainwall system of claim 2 wherein the transverse cross section of said weather seal is T-shaped and spline-like.

4. The curtainwall system of claim 2 wherein said stem member comprises a bulbous seal at its transverse terminus.

5. The curtainwall system of claim 4 wherein the bulbous seal of said stem member is substantially more pliable than the remainder of said weather seal.

6. The curtainwall system of claim 5 wherein said weather seal comprises coformed polymeric materials.

7. The curtainwall system of claim 3 further comprising sealing vanes which protrude from said stem member and are configured to contact said adjacent lights.

8. The curtainwall system of claim 1 further comprising retaining clips configured to interlock with structural interfaces and to engage said mullions, respectively.

9. The curtainwall system of claim 8 wherein each said structural interface comprises, in its transverse cross section, a U-shaped locking channel, and each said retaining clip comprises, in its transverse cross section, an L-shaped flange configured such that one end is keyed to said U-shaped channel and its other end snap-fits onto said respective mullion.

10. The curtainwall system of claim 1 further comprising covers for said mullions configured to conceal said structural interfaces.

11. The curtainwall system of claim 1, wherein the lights of glass are two-sided adhesively glazed.

12. The curtainwall system of claim 1 wherein the lights of glass are four-sided adhesively glazed.

13. The curtainwall system of claim 8 further comprising covers for said mullions configured to conceal said structural interfaces and to interlock onto said clips.

14. An adhesively glazed curtainwall system, comprising:

prebonded structural interfaces on each light of glass of the curtainwall system, which are secured during glazing onto the respective mullions of the curtainwall; and an elongate weather seal for nonstructurally weather sealing between adjacent lights of glass of the curtainwall and which are installed from the interior side of the curtainwall coincidentally with glazing and are configured so as to be captured by said structural interfaces when clipped onto said respective mullions, and wherein said adjacent lights of glass are nonabutted;

said elongate weather seal having a coextensive base member configured for capture by said structural interfaces, and a coextensive stem member configured to extend nonstructurally between adjacent lights of glass.

15. The curtainwall system of claim 14 wherein the transverse cross section of said weather seal is T-shaped and spline-like and further comprises sealing vanes which protrude from said stem member and are configured to contact said adjacent lights; and said stem member comprises a bulbous seal at its transverse terminus.

16. The curtainwall system of claim 14 further comprising retaining clips configured to interlock with said structural interfaces and to engage said mullions, respectively; and wherein each said structural interface comprises, in its transverse cross section, a U-shaped locking channel, and each said retaining clip comprises, in its transverse cross section, a L-shaped flange configured such that one end is keyed to said U-shaped channel and its other end snap-fits onto said respective mullion.

17. The curtainwall system of claim 15 further comprising covers for said mullions configured to conceal said structural interfaces.

18. An adhesively glazed curtainwall system, comprising:

prebonded structural interfaces on each light of glass of the curtainwall system, which are secured during glazing onto the respective mullions of the curtainwall; and means for nonstructurally weather sealing between adjacent lights of glass of the curtainwall and which are installed from the interior side of the curtainwall coincidentally with glazing and are configured so as to be captured by said structural interfaces when clipped onto said respective mullions, wherein said adjacent lights of glass are nonabutted; and further comprising covers for said mullions configured to conceal said structural interfaces and to interlock onto said clips.

19. The curtainwall system of claim 18 wherein said means comprise an elongate weather seal having a coextensive base member configured for capture by said structural interfaces, and a coextensive stem member configured to extend nonstructurally between adjacent lights of glass.

20. The curtainwall system of claim 19 wherein the transverse cross section of said weather seal is T-shaped and spline-like and further comprises sealing vanes which protrude from said stem member and are configured to contact said adjacent lights; and said stem member comprises a bulbous seal at its transverse terminus.

* * * * *

UNITED STATES PATENT AND TRADEMARK OFFICE
CERTIFICATE OF CORRECTION

PATENT NO. : 4,650,702

DATED : March 17, 1987

INVENTOR(S) : Wayne E. Whitmyer

It is certified that error appears in the above-identified patent and that said Letters Patent is hereby corrected as shown below:

Claim 1 should be deleted to appear as shown below.

1. An adhesively glazed curtainwall system, comprising:

prebonded structural interfaces on each light of glass of the curtainwall system, which are clipped during glazing onto the respective mullions of the curtainwall; and means for nonstructurally weather sealing between adjacent lights of glass of the curtainwall and which are installed from the interior side of the curtainwall coincidentally with glazing and are configured so as to be captured by said structural interfaces when clipped onto said respective mullions, wherein said adjacent lights of glass are nonabutted.

Signed and Sealed this

Twenty-third Day of August, 1988

*Attest:*

DONALD J. QUIGG

*Attesting Officer* *Commissioner of Patents and Trademarks*